May 14, 1935.  K. W. SÜSSMUTH  2,001,554
BEVERAGE PRODUCT
Filed July 15, 1933
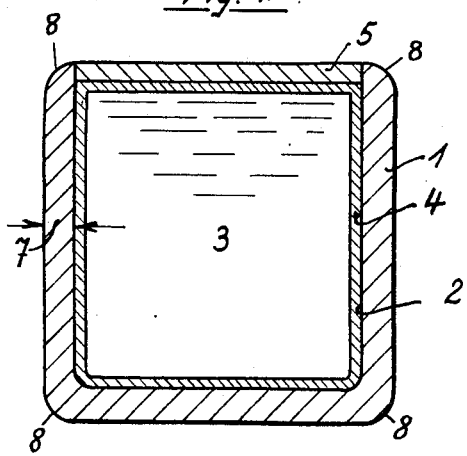
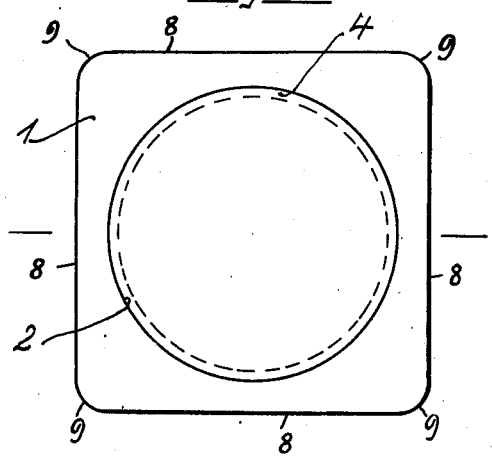
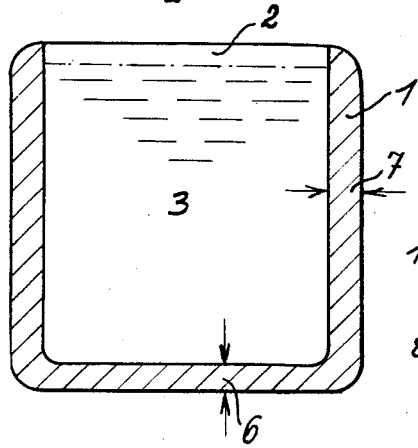
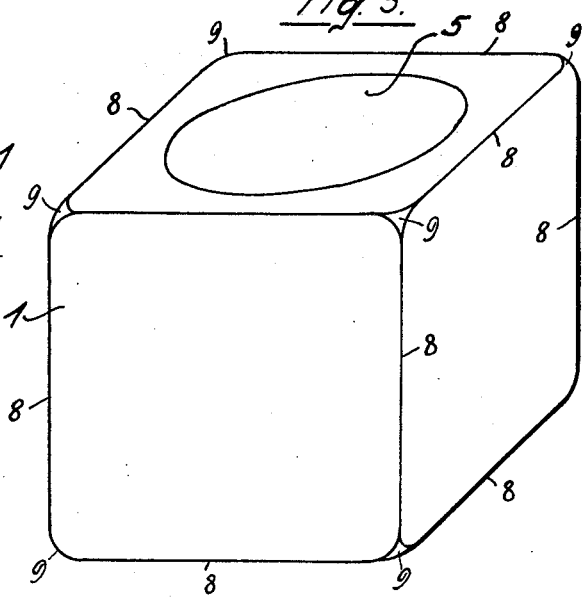
Inventor
Karl Wilhelm Süssmuth
By Karl Wischhöfer
Atty.

Patented May 14, 1935

2,001,554

UNITED STATES PATENT OFFICE 2,001,554

BEVERAGE PRODUCT

Karl Wilhelm Süssmuth, Langenau, near Ulm, Germany

Application July 15, 1933, Serial No. 680,557
In Germany July 22, 1932

1 Claim. (Cl. 99—11)

My invention relates to beverages and more especially to a beverage in concentrated form which can be carried about and made ready for use by the mere addition of hot or cold water, whenever required.

The invention more particularly concerns extracts serving for the preparation of beverages such as tea, coffee, fruit or plant juices etc., which are combined with the quantity of sugar required for imparting to the beverage the appropriate degree of sweetness, part of this sugar being at the same time utilized to envelop the extract and to form a solid shell therefor.

The product according to the present invention substantially consists of an extract of tea, coffee, fruit or plant juice or the like, which is saturated, preferably at an elevated temperature, with sugar, and a hollow body or shell, preferably having the outer form of a cube, consisting of fine-grained compressed sugar, the total quantity of sugar in the shell and in the extract being the quantity required to impart to the beverage prepared by diluting the extract with water, the required sweetness.

In the preparation of this product I prefer saturating the hot extract with sugar for instance by preparing a highly viscous watery solution of sugar by boiling or otherwise and mixing the sugar syrup thus obtained, while still hot, with the hot extract prepared in a well known manner. The mixture may be brought to boiling temperature and is shortly thereafter filled into cubiform hollow shapes formed by compressing moistened, fine-grained crystal sugar in a suitable mold, in which the cube is formed with a cavity, preferably of cylindrical form, whereupon it is dried thoroughly. The exposed surface of the saturated extract is preferably covered with a thin layer of fine crystal sugar and the opening is filled out with moist crystal sugar or a small cylindrical disc of sugar may be inserted in the opening to serve as a cover.

Obviously, since the concentrated extract was saturated with sugar at an elevated temperature, part of the sugar will crystallize out on cooling and form a lining on the inner walls of the cube.

The new product according to the present invention thus consists of a hollow cube or other body consisting of fine-grained compressed sugar and a concentrated plant extract saturated with sugar, which fills out the cavity of the sugar body and is confined therein by the cover, equally formed of sugar, which closes the aperture, the walls of the container thus formed being lined with a layer of sugar formed by crystallization from the extract.

By saturating the extract with sugar at an elevated temperature I provide that the liquid, viscous or pasty extract filling the sugar body is fully saturated with sugar and will therefore not be able to dissolve any of the sugar constituting the walls of the cube.

By forming the cube or other hollow body with a substantially cylindrical cavity I render the walls of the container thus formed particularly strong and resistive against compressive stresses.

In order to produce a cube sufficing for the preparation of a full cup I have found a cube having edges about 20 mms. long and formed with a cylindrical cavity having a diameter of about 16.4 mms. and a bottom about 1.8 mms. thick to be particularly suitable.

In the drawing affixed to this specification and forming part thereof one form of the product according to the present invention is illustrated diagrammatically by way of example.

In the drawing

Fig. 1 is a vertical section,

Fig. 2 is a plan view and

Fig. 3 is a perspective view, while

Fig. 4 illustrates the open cubiform shell with the extract filled in, but not yet closed.

Referring to the drawing, 1 is the wall of the hollow sugar body and 2 is the cylindrical cavity formed therein. 3 is a body of sugar-saturated plant extract (prepared from tea, coffee, fruits etc.). 4 is the sugar lining covering the inner walls of the hollow body and 5 is the cover closing the aperture. 6 in Fig. 4 indicates the thickness of the bottom, 7 the thickness of the thinnest portions of the side wall. The edges 8 are preferably slightly rounded and so are the corners 9.

The thickness of the sugar lining 4 formed by crystallization from the saturated extract may be very small, being preferably within the range of 0.1 to 1.0 mms.

The figures here given concerning the dimensions of the parts indicate a cube of a size which suffices to prepare a cup full of the beverage in question. Larger or smaller hollow bodies may be used according to the requirements of each individual case and the wall thickness, diameter etc. will then vary accordingly.

Preferably the sugar mass forming the hollow body is not compressed too heavily in order to impart to it a ready solubility.

Obviously the extract saturated with sugar may be liquid, highly viscous or pasty, and solid matter, such as for instance cocoa powder, or condensed milk or the like may be admixed to it.

I am aware that hollow bodies consisting of sugar, chocolate or the like and containing liqueur are available on the market, however, the liquid contents of these products is not adapted, when diluted with water, to form a beverage and the shell or outer body being made of chocolate or boiled and poured sugar is not adapted for the preparation of a beverage either, since it dissolves in water only with great difficulty.

Various changes may be made in the details disclosed in the foregoing specification without departing from the invention or sacrificing the advantages thereof.

In the claim affixed to this specification no selection of any particular modification of the invention is intended to the exclusion of other modifications thereof and the right to subsequently make claim to any modification not covered by this claim is expressly reserved.

I claim:—

Preserved beverage comprising a closed shell of fine-grained compressed sugar, a body of a plant extract saturated with sugar enclosed in said shell, and a lining of crystallized sugar separated out from said body on the inner wall of said shell.

KARL WILHELM SÜSSMUTH.